US012548367B2

(12) United States Patent
Di et al.

(10) Patent No.: US 12,548,367 B2
(45) Date of Patent: Feb. 10, 2026

(54) METHOD AND APPARATUS FOR FINGERPRINT RECOGNITION

(71) Applicant: HONOR DEVICE CO., LTD., Shenzhen (CN)

(72) Inventors: Haoxuan Di, Shenzhen (CN); Junlong Guo, Shenzhen (CN); Danhong Li, Shenzhen (CN); Xiaowu Zhang, Shenzhen (CN)

(73) Assignee: Honor Device Co., Ltd., Shenzhen (CN)

(*) Notice: Subject to any disclaimer, the term of this patent is extended or adjusted under 35 U.S.C. 154(b) by 0 days.

(21) Appl. No.: 18/840,472

(22) PCT Filed: May 5, 2023

(86) PCT No.: PCT/CN2023/092233
§ 371 (c)(1),
(2) Date: Aug. 21, 2024

(87) PCT Pub. No.: WO2024/037053
PCT Pub. Date: Feb. 22, 2024

(65) Prior Publication Data
US 2025/0157250 A1 May 15, 2025

(30) Foreign Application Priority Data
Aug. 18, 2022 (CN) .......................... 202210995240.4

(51) Int. Cl.
*G06V 40/13* (2022.01)
*G06V 40/12* (2022.01)

(52) U.S. Cl.
CPC ...... *G06V 40/1365* (2022.01); *G06V 40/1347* (2022.01)

(58) Field of Classification Search
CPC ..................................................... G06V 40/13
See application file for complete search history.

(56) References Cited

U.S. PATENT DOCUMENTS

| 5,170,264 A | 12/1992 | Saito et al. |
| 6,707,983 B1 | 3/2004 | Endo |

(Continued)

FOREIGN PATENT DOCUMENTS

| CN | 104050483 A | 9/2014 |
| CN | 105027520 A | 11/2015 |

(Continued)

OTHER PUBLICATIONS

Lumini et al., "An improved BioHashing for human authentication," Pattern Recognition, Mar. 2007, 40(3):1057-1065.

(Continued)

*Primary Examiner* — Joseph R Haley
(74) *Attorney, Agent, or Firm* — Fish & Richardson P.C.

(57) ABSTRACT

A method and an apparatus for fingerprint recognition are provided. The method is applied to the field of fingerprint recognition technologies. The method includes: acquiring a to-be-verified fingerprint image; determining a first eigenvector based on the to-be-verified fingerprint image, where the first eigenvector is obtained by performing dimensionality reduction processing on a second eigenvector using a first orthogonal matrix, and the second eigenvector is used to represent a feature of the to-be-verified fingerprint image; and performing fingerprint matching based on the first eigenvector and a third eigenvector, where the third eigenvector is obtained by performing dimensionality reduction processing on a fourth eigenvector using the first orthogonal matrix, the fourth eigenvector is used to represent a feature of a first fingerprint template, and the third eigenvector is stored in a fingerprint template library.

20 Claims, 8 Drawing Sheets

(56) References Cited

U.S. PATENT DOCUMENTS

| | | | |
|---|---|---|---|
| 9,276,605 | B2 | 3/2016 | Xia et al. |
| 9,660,667 | B2 | 5/2017 | Kang et al. |
| 9,690,972 | B1* | 6/2017 | Chau ................... H04L 63/0861 |
| 9,904,840 | B2 | 2/2018 | Zhang et al. |
| 10,546,215 | B2* | 1/2020 | Roller .................... G06F 18/22 |
| 2003/0152281 | A1 | 8/2003 | Tomita et al. |
| 2022/0262161 | A1* | 8/2022 | Zhao .................. G06V 40/1388 |
| 2023/0342792 | A1* | 10/2023 | Leathart ............ G06F 18/21355 |

FOREIGN PATENT DOCUMENTS

| | | |
|---|---|---|
| CN | 105335713 A | 2/2016 |
| CN | 109685029 A | 4/2019 |
| CN | 109886127 A | 6/2019 |
| CN | 110555380 A | 12/2019 |
| CN | 110825904 A | 2/2020 |
| CN | 111062230 A | 4/2020 |
| CN | 111382867 A | 7/2020 |
| CN | 111738194 A | 10/2020 |
| CN | 111931757 A | 11/2020 |
| CN | 113312946 A | 8/2021 |
| CN | 114266729 A | 4/2022 |
| CN | 114399796 A | 4/2022 |
| CN | 116311389 A | 6/2023 |
| KR | 20150074703 A | 7/2015 |
| KR | 20190136587 A | 12/2019 |

OTHER PUBLICATIONS

Sun et al., "The Research on Dimension Reduction Methods of Text Mining," Computer Knowledge and Technology, Dec. 12, 2007, 5 pages (with English abstract).

* cited by examiner

METHOD AND APPARATUS FOR FINGERPRINT RECOGNITION

This application is a national stage of International Application No. PCT/CN2023/092233, filed May 5, 2023, which claims priority to Chinese Patent Application No. 202210995240.4, filed on Aug. 18, 2022. The disclosures of the aforementioned applications are hereby incorporated by reference in their entireties.

TECHNICAL FIELD

This application relates to the field of biological recognition, and specifically, to a method and an apparatus for fingerprint recognition.

BACKGROUND

With the popularization of a smart terminal, a fingerprint recognition technology has rapidly developed in the field of terminals. Particularly when a user wears a face mask, compared with face unlocking, fingerprint unlocking is indispensable. In a fingerprint unlocking process, a fingerprint template needs to be input in advance for fingerprint unlocking. A plenty of feature points of fingerprint images are stored in the fingerprint template. As a result, feature data of the fingerprint images stored in the fingerprint template occupies a large memory. Therefore, how to reduce memory space occupied by the fingerprint template becomes a problem to be urgently resolved.

SUMMARY

In view of this, this application provides a method and an apparatus for fingerprint recognition, a computer-readable storage medium, and a computer program product. Dimensionality reduction processing is performed on fingerprint feature data, so that memory space occupied by a fingerprint template can be reduced, matching complexity can be reduced, and user experience in fingerprint recognition can be greatly improved.

According to a first aspect, a method for fingerprint recognition is provided. The method is applied to an electronic device. The method includes:
acquiring a to-be-verified fingerprint image:
determining a first eigenvector based on the to-be-verified fingerprint image, where the first eigenvector is obtained by performing dimensionality reduction processing on a second eigenvector using a first orthogonal matrix, and the second eigenvector is used to represent a feature of the to-be-verified fingerprint image; and
performing fingerprint matching based on the first eigenvector and a third eigenvector, where the third eigenvector is obtained by performing dimensionality reduction processing on a fourth eigenvector using the first orthogonal matrix, the fourth eigenvector is used to represent a feature of a first fingerprint template, and the third eigenvector is stored in a fingerprint template library.

The first orthogonal matrix includes a plurality of vectors. The plurality of vectors are generated through iterative calculation based on a pre-acquired fingerprint feature point. Each of the plurality of vectors is capable of dividing the pre-acquired fingerprint feature point into two parts.

The method may be performed by a terminal device or a chip in a terminal device. Based on the foregoing solution, the to-be-verified fingerprint image is acquired. Dimensionality reduction processing is performed on the to-be-verified fingerprint image using the first orthogonal matrix to obtain the first eigenvector. Then, fingerprint matching is performed using the first eigenvector and the third eigenvector stored in the fingerprint template library. Therefore, memory space of the electronic device occupied by feature data can be reduced. In addition, feature data obtained through dimensionality reduction processing is used for matching, so that complexity can be reduced, and a matching speed can be increased.

In a possible implementation, the performing fingerprint matching based on the first eigenvector and a third eigenvector includes:
calculating a Hamming distance based on the first eigenvector and the third eigenvector; and
when the Hamming distance is less than a first distance threshold, determining that the to-be-verified fingerprint image is successfully matched with the first fingerprint template.

Optionally, the Hamming distance satisfies the following formula:

$$d = \text{count}(\text{XOR}(H_1, H_2))$$

Herein, d represents the Hamming distance. count ( ) represents a non-zero counting operation. XOR represents an exclusive OR operation. $H_1$ represents the first eigenvector. $H_2$ represents the third eigenvector.

Therefore, compared with performing matching by calculating a Euclidean distance in a conventional technology, calculating the Hamming distance to determine whether matching succeeds in embodiments of this application can reduce the matching complexity while ensuring matching accuracy, and helps increase the matching speed.

In a possible implementation, the first orthogonal matrix is obtained in the following manner:
initializing a first orthogonal vector set, where the first orthogonal vector set is null;
generating a first random vector, where the first random vector is an n-dimensional vector:
determining whether the first random vector is orthogonal to a vector in the first orthogonal vector set:
when the first random vector is orthogonal to the vector in the first orthogonal vector set, determining whether the first random vector is capable of dividing the pre-acquired fingerprint feature point into two parts:
when the first random vector divides the fingerprint feature point, adding the first random vector to the first orthogonal vector set:
determining whether a quantity of vectors included in the first orthogonal vector set is n; and
when the quantity of vectors comprised in the first orthogonal vector set is n, expanding vectors in the first orthogonal vector set by rows to obtain the first orthogonal matrix, where the first orthogonal matrix includes n row vectors, and the n row vectors of the first orthogonal matrix are orthogonal to each other.

Therefore, the first orthogonal vector set is generated through continuous attempts. In this way, a most suitable orthogonal matrix for distinguishing a fingerprint feature can be found, to prepare for performing dimensionality reduction using the first orthogonal matrix.

In a possible implementation, the third eigenvector is obtained by the following method:
performing a multiplication operation on the first orthogonal matrix and a transposed matrix of the fourth eigenvector to obtain a product:

processing the obtained product through a sign function to obtain a fifth eigenvector; and performing binary conversion processing on a vector element in the fifth eigenvector to obtain the third eigenvector.

In the foregoing manner, dimensionality reduction processing is performed on the fourth eigenvector using the first orthogonal matrix to obtain the third eigenvector, so that memory space occupied by a fingerprint template can be effectively reduced.

In a possible implementation, a quantity of bytes occupied by the third eigenvector is less than that of bytes occupied by the fourth eigenvector.

After dimensionality reduction processing, the quantity of bytes occupied by the third eigenvector stored in the fingerprint template library is less than that of bytes occupied by the fourth eigenvector. Therefore, occupied memory space is greatly reduced.

In a possible implementation, the method further includes:

displaying a first interface, where the first interface includes a first option, and the first option is used to turn on or turn off a fingerprint matching optimization function.

Therefore, embodiments of this application further provide a switch option for a fingerprint feature matching optimization function, for a user to select to turn on or turn off the fingerprint feature matching optimization function.

According to a second aspect, an apparatus for fingerprint recognition is provided, including units configured to perform the method in any implementation of the first aspect. The apparatus may be a terminal (or a terminal device), or a chip in a terminal (or a terminal device). The apparatus includes an input unit, a display unit, and a processing unit.

When the apparatus is the terminal, the processing unit may be a processor, the input unit may be a communication interface, and the display unit may be a graphic processing module and a screen. The terminal may further include a memory. The memory is configured to store computer program code. When the processor executes the computer program code stored in the memory, the terminal is enabled to perform the method in any implementation of the first aspect.

When the apparatus is the chip in the terminal, the processing unit may be a logic processing unit inside the chip, the input unit may be an input interface, a pin, a circuit, or the like, and the display unit may be a graphic processing unit inside the chip. The chip may further include a memory. The memory may be a memory (for example, a register or a cache) in the chip, or a memory (for example, a read-only memory or a random access memory) located outside the chip. The memory is configured to store computer program code. When the processor executes the computer program code stored in the memory, the chip is enabled to perform the method in any implementation of the first aspect.

According to a third aspect, a computer-readable storage medium is provided. The computer-readable storage medium stores computer program code. When the computer program code is run by an apparatus for fingerprint recognition, the apparatus is enabled to perform the method in any implementation of the first aspect.

According to a fourth aspect, a computer program product is provided. The computer program product includes computer program code. When the computer program code is run by an apparatus for fingerprint recognition, the apparatus is enabled to perform the method in any implementation of the first aspect.

DESCRIPTION OF EMBODIMENTS

Figure 1:
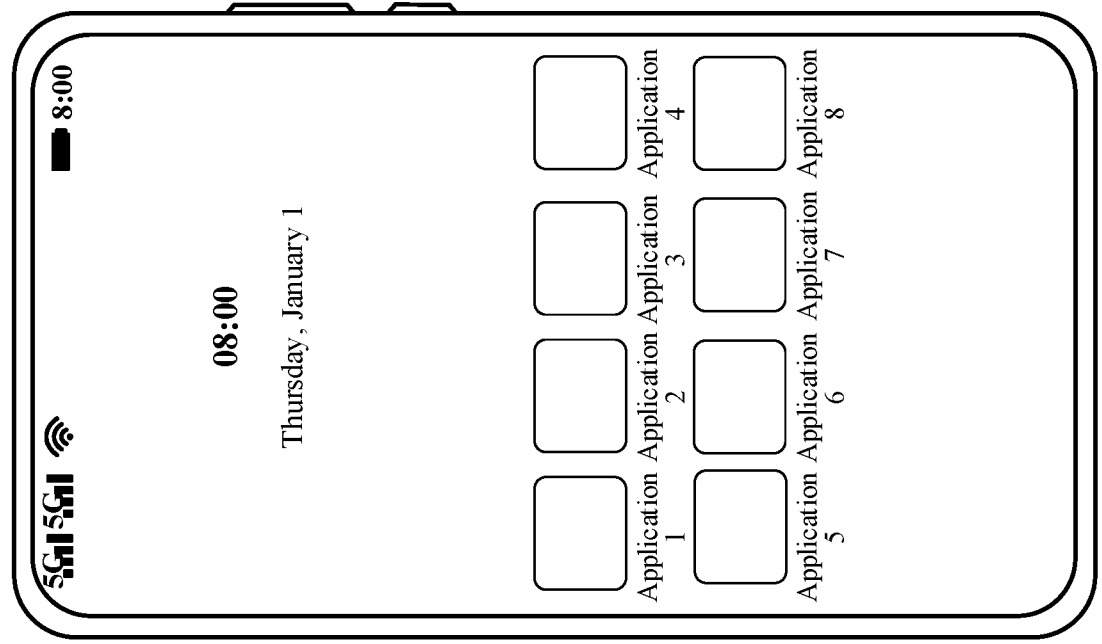
FIG. 1 is an example diagram of an application scenario according to an embodiment of this application.
Figure 1:
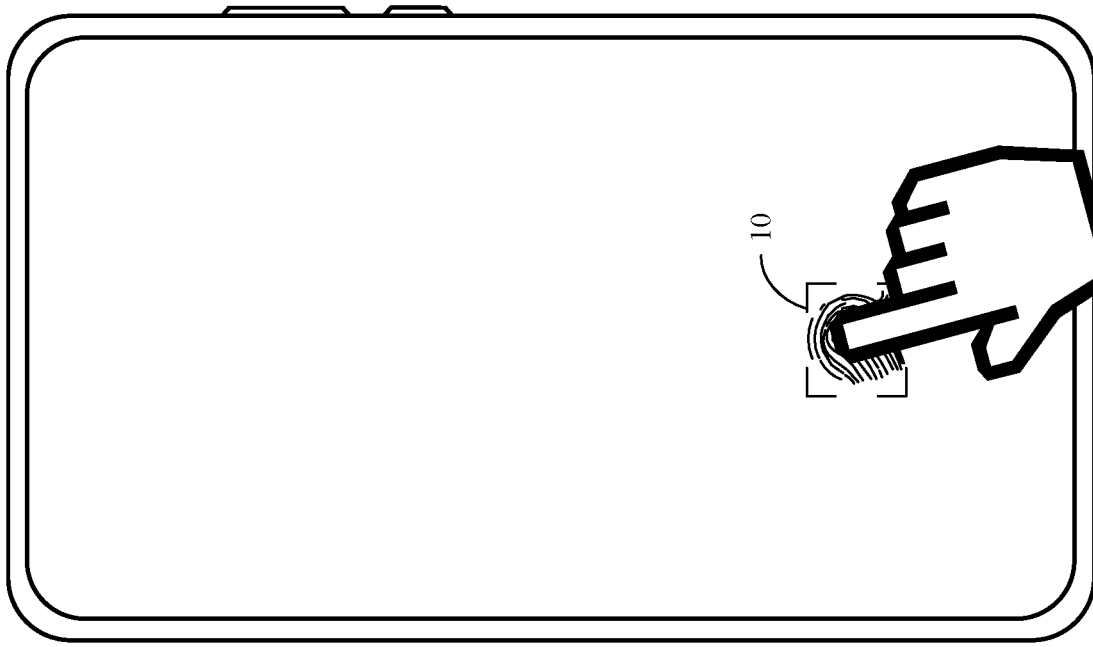

The following describes technical solutions in embodiments of this application with reference to the accompanying drawings.

A method for fingerprint recognition provided in an embodiment of this application may be applied to an electronic device with a fingerprint recognition function. For example, the electronic device may be a mobile phone, a tablet computer, a notebook computer, a wearable device, a multimedia player, an e-book reader, a personal computer, a personal digital assistant (personal digital assistant, PDA), a netbook, an augmented reality (augmented reality, AR) device, or a virtual reality (virtual reality, VR) device. A specific form of the electronic device is not limited in this application.

By way of example but not limitation, when the electronic device is a wearable device, the wearable device may be a general term for wearable devices, such as glasses, gloves, watches, clothing, and shoes, developed by applying wearable technologies in intelligent designs of daily wear. The wearable device is a portable device that is directly worn on a body or integrated into clothes or an accessory of a user, and may acquire biological feature data of the user. The wearable device not only is a hardware device but also realizes powerful functions through software support, data interaction, and cloud interaction. In an implementation, a wearable smart device includes a device, for example, a smartwatch or smart glasses, that is comprehensive in function and large in size and that can perform some or all functions without relying on a smartphone. In another implementation, a wearable smart device may be a device, for example, a smart band including an unlocked touchscreen or a smart jewelry, that focuses only on a specific type of application function and needs to be used in cooperation with another device (for example, a smartphone).

An application scenario of fingerprint recognition is not specifically limited in this embodiment of this application, and this embodiment of this application is applied to all scenarios involving recognition with a fingerprint, for example, unlocking, payment, or identity authentication performed by the user using a fingerprint.

This embodiment of this application may be applied to an optical fingerprint recognition scenario. Optical fingerprint recognition mainly uses principles of light reflection and refraction. When a finger presses a screen, the screen is turned on and emits light, the light illuminates a fingerprint, and then the fingerprint is transmitted to a sensor under the screen through reflection and refraction for recognition. The fingerprint recognition scenario is not specifically limited in this embodiment of this application, and embodiments of this application may also be appropriately applied to other fingerprint recognition scenarios, for example, ultrasonic fingerprint recognition and capacitive fingerprint recognition.

It may be understood that a location of a fingerprint module is not specifically limited in this embodiment of this application. For example, if an optical fingerprint recognition technology is used, the fingerprint module may be disposed under the screen of the electronic device, that is, implements in-screen fingerprint recognition. For another example, the fingerprint module may alternatively be disposed on the back of the electronic device.

FIG. 1 is a diagram of an application scenario according to an embodiment of this application. For example, the electronic device is a mobile phone. The mobile phone uses in-screen fingerprint unlocking. As shown in (1) in FIG. 1, the user presses a fingerprint unlocking region 10 of the screen to try to perform fingerprint unlocking. After the user presses the fingerprint unlocking region 10, the mobile phone matches an acquired fingerprint with a fingerprint template pre-stored by the user. If matching succeeds, the screen of the mobile phone is successfully unlocked.

It should be understood that the fingerprint unlocking region 10 shown in (1) in FIG. 1 is merely an example for description, and this embodiment of this application is not limited thereto. In fact, the fingerprint unlocking region 10 may be located in another region of the screen, for example, a screen region close to a power button.

It should further be understood that fingerprint unlocking in (1) in FIG. 1 is described using in-screen fingerprint unlocking as an example, and this embodiment of this application is not limited thereto. For example, this embodiment of this application is also applied to back fingerprint unlocking of the mobile phone.

After the fingerprint of the user is successfully matched, a home screen of the mobile phone may be entered. In a possible case, for example, the mobile phone displays an interface shown in (2) in FIG. 1 after successful fingerprint unlocking, where icons of a plurality of applications, for example, an application 1 to an application 8, are displayed on the interface. Certainly, the interface shown in (2) in FIG. 1 is merely a possible case, and this embodiment of this application is not limited thereto.

It should be understood that the scenario in FIG. 1 only schematically describes one application scenario of this application, this does not constitute a limitation on this embodiment of this application, and this application is not limited thereto.

Figure 2:
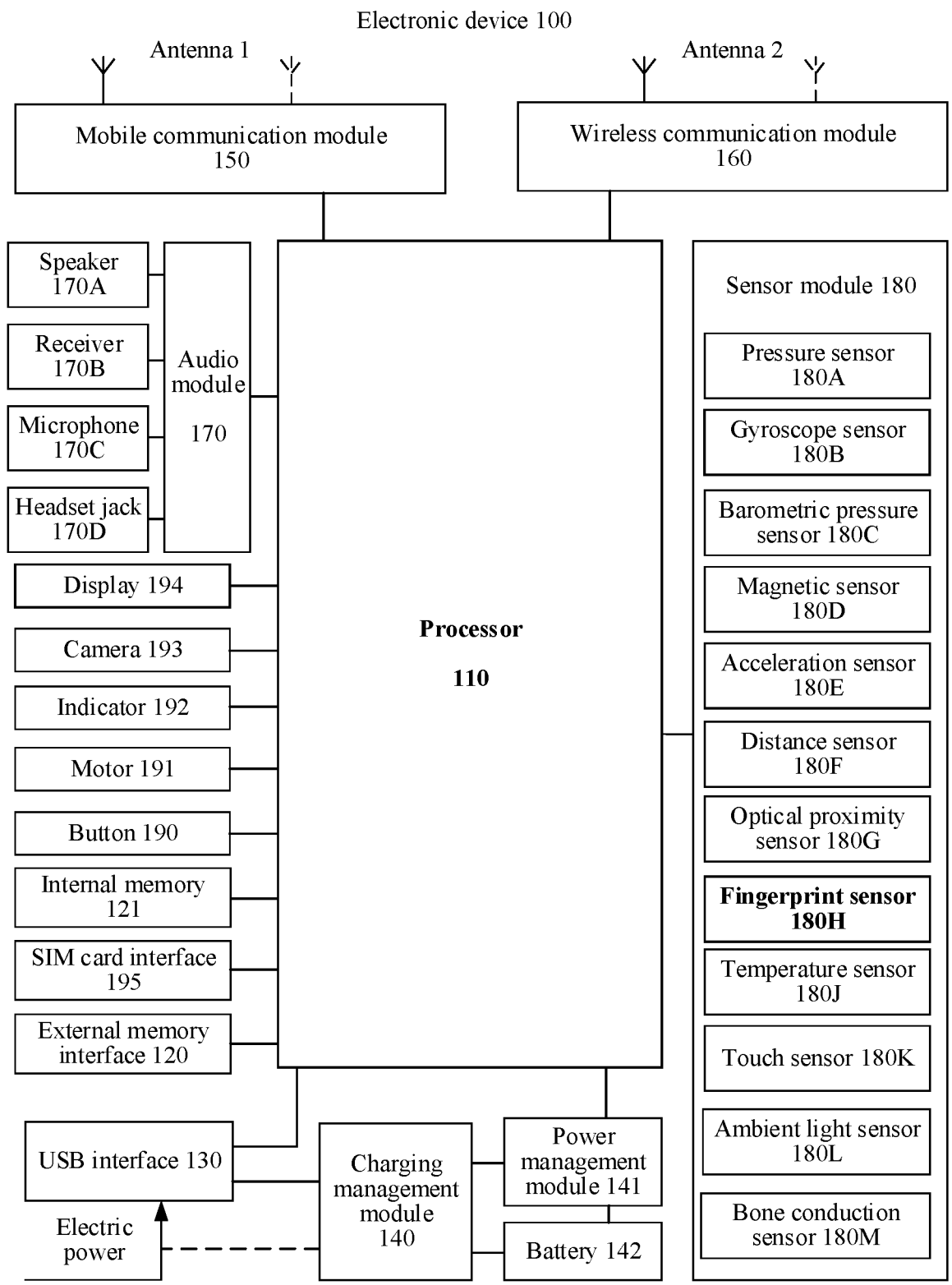
FIG. 2 is a diagram of a hardware system of an electronic device applied to this application.
Figure 3:
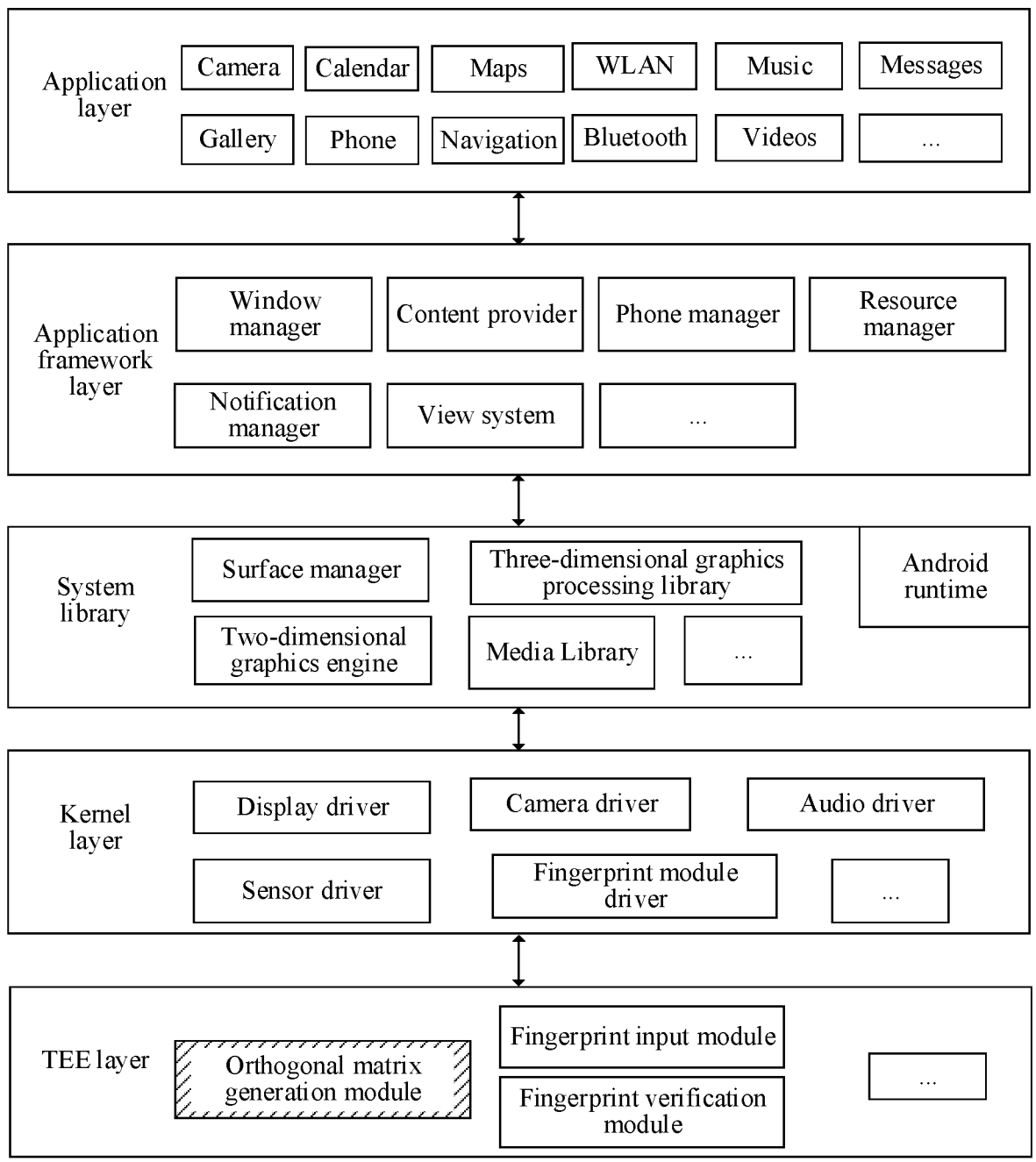
FIG. 3 is a diagram of a software system of an electronic device applied to this application.

The following describes, with reference to FIG. 2 and FIG. 3, a hardware system and a software architecture that are applied to this embodiment of this application.

FIG. 2 shows a hardware system of an electronic device applied to this application.

An electronic device 100 may be a mobile phone, a smartscreen, a tablet computer, a wearable electronic device, an in-vehicle electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the electronic device 100 is not limited in this embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that the structure shown in FIG. 2 does not constitute a specific limitation on the electronic device 100. In some other embodiments of this application, the electronic device 100 may include more or fewer components than those shown in FIG. 2, the electronic device 100 may include a combination of some of the components shown in FIG. 2, or the electronic device 100 may include subcomponents of some of the components shown in FIG. 2. For example, the optical proximity sensor 180G shown in FIG. 2 may be optional. The components shown in FIG. 2 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent devices, or may be integrated devices.

The controller may generate an operation control signal based on an instruction operation code and a timing signal, to implement control on instruction fetching and execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

A connection relationship between the modules shown in FIG. 2 is only schematically described, and does not constitute a limitation on a connection relationship between the modules of the electronic device 100. Optionally, the modules of the electronic device 100 may alternatively use a combination of a plurality of connection manners in the foregoing embodiment.

The electronic device 100 may implement a display function through the GPU, the display 194, and the application processor. The GPU is a microprocessor for image processing, and connects the display 194 and the application processor. The GPU is configured to perform mathematical and geometric calculation for graphics rendering. The processor 110 may include one or more GPUs that execute program instructions to generate or change display information.

The display 194 may be configured to display an image or a video. The display 194 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini light-emitting diode (mini light-emitting diode, Mini LED), a micro light-emitting diode (micro light-emitting diode, Micro LED), a micro OLED (Micro OLED), or a quantum dot light-emitting diode (quantum dot light emitting diodes, QLED). In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is opened, and light is transmitted to a photosensitive element of the camera through a lens. An optical signal is converted into an electrical signal. The photosensitive element of the camera transmits the electrical signal to the ISP for processing, to convert the electrical signal into a visible image. The ISP may perform algorithm optimization on noise, brightness, and a color of the image. The ISP may further optimize parameters such as exposure and a color temperature of a photographing scenario. In some embodiments, the ISP may be disposed in the camera 193.

The camera 193 is configured to capture a still image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into an image signal in a standard format of red green blue (red green blue, RGB), YUV, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 performs frequency selection, the digital signal processor is configured to perform Fourier transform and the like on frequency energy.

The electronic device 100 may implement an audio function such as music play back and sound recording through the audio module 170, the speaker 170A, the receiver 170B, the microphone 170C, the headset jack 170D, the application processor, and the like.

The pressure sensor 180A is configured to sense a pressure signal, and may convert the pressure signal into an electrical signal. In some embodiments, the pressure sensor 180A may be disposed in the display 194. There are many types of pressure sensors 180A, for example, a resistive pressure sensor, an inductive pressure sensor, or a capacitive pressure sensor. The capacitive pressure sensor may include at least two parallel plates with conductive materials. When force acts on the pressure sensor 180A, capacitance between electrodes changes, and the electronic device 100 determines pressure strength based on a change in the capacitance. When a touch operation is performed on the display 194, the electronic device 100 detects the touch operation based on the pressure sensor 180A. The electronic device 100 may also calculate a touch location based on a detected signal of the pressure sensor 180A. In some embodiments, touch operations performed on a same touch location but with different touch operation strength may correspond to different operation instructions. For example, when a touch operation with touch operation strength less than a first pressure threshold is performed on a short message application icon, an instruction of viewing short messages is executed. When a touch operation with touch operation strength greater than or equal to the first pressure threshold is performed on the short message application icon, an instruction of creating a new short message is executed.

The optical proximity sensor 180G may include, for example, a light-emitting diode (light-emitting diode, LED) and an optical detector, for example, a photodiode. The LED may be an infrared LED. The electronic device 100 emits infrared light through the LED. The electronic device 100 detects infrared reflected light from a nearby object through the photodiode. When reflected light is detected, the electronic device 100 may determine that there is an object near the electronic device 100. When no reflected light is detected, the electronic device 100 may determine that there is no object near the electronic device 100. The electronic device 100 may use the optical proximity sensor 180G to detect whether a user holds the electronic device 100 close to an ear for a call, to automatically turn off a screen to save power. The optical proximity sensor 180G may be further configured to automatically unlock and lock the screen in a holster mode or a pocket mode. It should be understood that the optical proximity sensor 180G in FIG. 2 may be an optional component. In some scenarios, an ultrasonic sensor may be used to replace the optical proximity sensor 180G to detect proximity light.

The fingerprint sensor 180H is configured to acquire a fingerprint. The electronic device 100 may use a feature of the acquired fingerprint to implement functions such as unlocking, accessing an application lock, photographing, and receiving a call.

The touch sensor 180K is also referred to as a touch device. The touch sensor 180K may be disposed on the display 194. The touch sensor 180K and the display 194 form a touchscreen, and the touchscreen is also referred to as a touch control screen. The touch sensor 180K is configured to detect a touch operation performed on or near the touch sensor. The touch sensor 180K may transfer the detected touch operation to the application processor to determine a type of a touch event. A visual output related to the touch operation may be provided on the display 194. In some other embodiments, the touch sensor 180K may alternatively be disposed on a surface of the electronic device 100 at a location different from that of the display 194.

The button 190 includes a power button and a volume button. The button 190 may be a mechanical button, or may be a touch button. The electronic device 100 may receive a key input signal and implement a function related to the key input signal.

The motor 191 may generate a vibration. The motor 191 may be configured to provide an incoming call prompt, and may be further configured to provide touch feedback. The motor 191 may generate different vibration feedback effects for touch operations performed on different applications. The motor 191 may also generate different vibration feedback effects for touch operations performed on different regions of the display 194. Different application scenarios (for example, a time reminder, information receiving, an alarm clock, and a game) may correspond to different vibration feedback effects. Touch vibration feedback effects may be customized.

The hardware system of the electronic device 100 is described in detail above. A software system of the electronic device 100 is described below. The software system may use a layered architecture, an event-driven architecture, a microkernel architecture, a microservice architecture, or a cloud architecture. The layered architecture is used as an example in this embodiment of this application to describe an example of the software system of the electronic device 100.

As shown in FIG. 3, the software system using the layered architecture is divided into several layers, and each layer has a clear role and task. The layers communicate with each other through a software interface. In some embodiments, the software system may be divided into five layers: an application layer, an application framework layer, an Android runtime (Android Runtime) and system library, a kernel layer, and a trusted execution environment (trusted execution environment, TEE) layer from top to bottom.

The application layer may include applications such as Camera, Gallery, Calendar, Phone, Maps, Navigation, WLAN, Bluetooth, Music, Videos, and Messages.

The application framework layer provides an application programming interface (application programming interface, API) and a programming framework for the applications at the application layer. The application framework layer may include some predefined functions.

For example, the application framework layer includes a window manager, a content provider, a view system, a phone manager, a resource manager, and a notification manager.

The window manager is configured to manage a window application. The window manager may obtain a display size, determine whether there is a status bar, perform screen locking, and take a screenshot.

The content provider is configured to store and obtain data, and make the data accessible to an application. The data may include a video, an image, audio, calls made and answered, a browsing history and a bookmark, and a phone book.

The view system includes visual controls such as a text display control and a picture display control. The view system may be configured to construct an application. A display interface may include one or more views. For example, a display interface including an SMS message notification icon may include a text display view and a picture display view.

The phone manager is configured to provide a communication function for the electronic device 100, for example, management of a call status (answering or declining).

The resource manager provides various resources for an application, such as a localized string, an icon, a picture, a layout file, and a video file.

The notification manager enables an application to display notification information in the status bar, which may be used to convey a notification-type message and may automatically disappear after a short stay without user interaction. For example, the notification manager is configured to provide a notification of download completion and a message notification. The notification manager may further manage a notification that appears in the status bar at a top of the system in a form of a graph or scroll bar text, for example, a notification of an application running in the background. The notification manager may further manage a notification that appears on the screen in a form of a dialog window. For example, text information is displayed in the status bar, a prompt tone is made, the electronic device vibrates, or an indicator light blinks.

The Android runtime includes a kernel library and a virtual machine. The Android runtime is responsible for scheduling and managing an Android system.

The kernel library includes two parts: one part is a function that needs to be invoked by a Java language, and the other part is a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

A system library may include a plurality of function modules, for example, a surface manager (surface manager), a media library (Media Libraries), a three-dimensional graphics processing library (for example, an open graphics library for embedded systems (open graphics library for embedded systems, OpenGL ES)), and a 2D graphics engine (for example, a skia graphics library (skia graphics library, SGL)).

The surface manager is configured to manage a display subsystem and provide fusion of 2D and 3D layers for a plurality of applications.

The media library supports playback and recording of audio in a plurality of formats, play back and recording of videos in a plurality of formats, and still image files. The media library may support a variety of audio and video encoding formats, for example, MPEG4, H.264, moving picture experts group audio layer III (moving picture experts group audio layer III, MP3), advanced audio coding (advanced audio coding, AAC), adaptive multi-rate (adaptive multi-rate, AMR), joint photographic experts group (joint photographic experts group, JPG), and portable network graphics (portable network graphics, PNG).

The three-dimensional graphics processing library may be configured to implement three-dimensional graphics drawing, image rendering, composition, and layer processing.

The two-dimensional graphics engine is a drawing engine for 2D drawing.

The kernel layer is a layer between hardware and software. The kernel layer may include drive modules such as a fingerprint module driver, a display driver, a camera driver, an audio driver, and a sensor driver.

The TEE layer may provide a security service for the Android system. The TEE layer is configured to perform various biometric recognition algorithms. The TEE layer is usually configured to perform key operations: (1) mobile payment: fingerprint verification, PIN code input, and the like: (2) secure storage of confidential data such as a private key and a certificate; and (3) content including: digital rights protection, digital rights management, or the like.

In some possible embodiments, the TEE layer includes a fingerprint input module, a fingerprint verification module, and an orthogonal matrix generation module. Optionally, the orthogonal matrix generation module may be independently disposed at the TEE layer (for example, as shown in FIG. 3), or may be located in the fingerprint verification module or the fingerprint input module. This is not specifically limited in this embodiment of this application. In this embodiment of this application, the orthogonal matrix generation module is configured to generate a first orthogonal matrix. The first orthogonal matrix is used to perform dimensionality reduction processing on a feature of a fingerprint image (the fingerprint image may be represented by a fingerprint feature descriptor, for example, an eigenvector).

It should be understood that the foregoing uses an example to describe the diagram of the structure of the electronic device based on FIG. 2, and uses an example to describe the diagram of the software architecture in this embodiment of this application based on FIG. 3. However, this embodiment of this application is not limited thereto.

Currently, a feature point descriptor of a fingerprint image stored in a fingerprint template is usually represented by an n-dimensional vector generated by a sift algorithm. However, representing a fingerprint feature by such a method may cause data excessively stored in the fingerprint template, occupying a large memory of an electronic device. In addition, fingerprint matching between the fingerprint template and a to-be-verified fingerprint image is complex in calculation and time-consuming, seriously affecting user experience.

For example, the feature point descriptor may be used to describe an attribute of a fingerprint feature point (for example, a bifurcation point or an endpoint). It is uniformly noted herein that a representation form of the feature point descriptor may be an eigenvector. For example, the feature point descriptor is the n-dimensional vector, that is, $V=(v_1, v_2, \ldots, v_n)$.

In view of this, this embodiment of this application aims to reduce memory space occupied by the fingerprint feature in a manner of performing dimensionality reduction on the fingerprint feature. In addition, matching is performed based on a fingerprint feature obtained through dimensionality reduction, so that calculation complexity can be reduced.

The following describes, with reference to FIG. 4 to FIG. 7, the method for fingerprint recognition according to this embodiment of this application. It may be understood that the following method for fingerprint recognition may be implemented in an electronic device (for example, the electronic device shown in FIG. 2) with the foregoing hardware structure.

Figure 4:
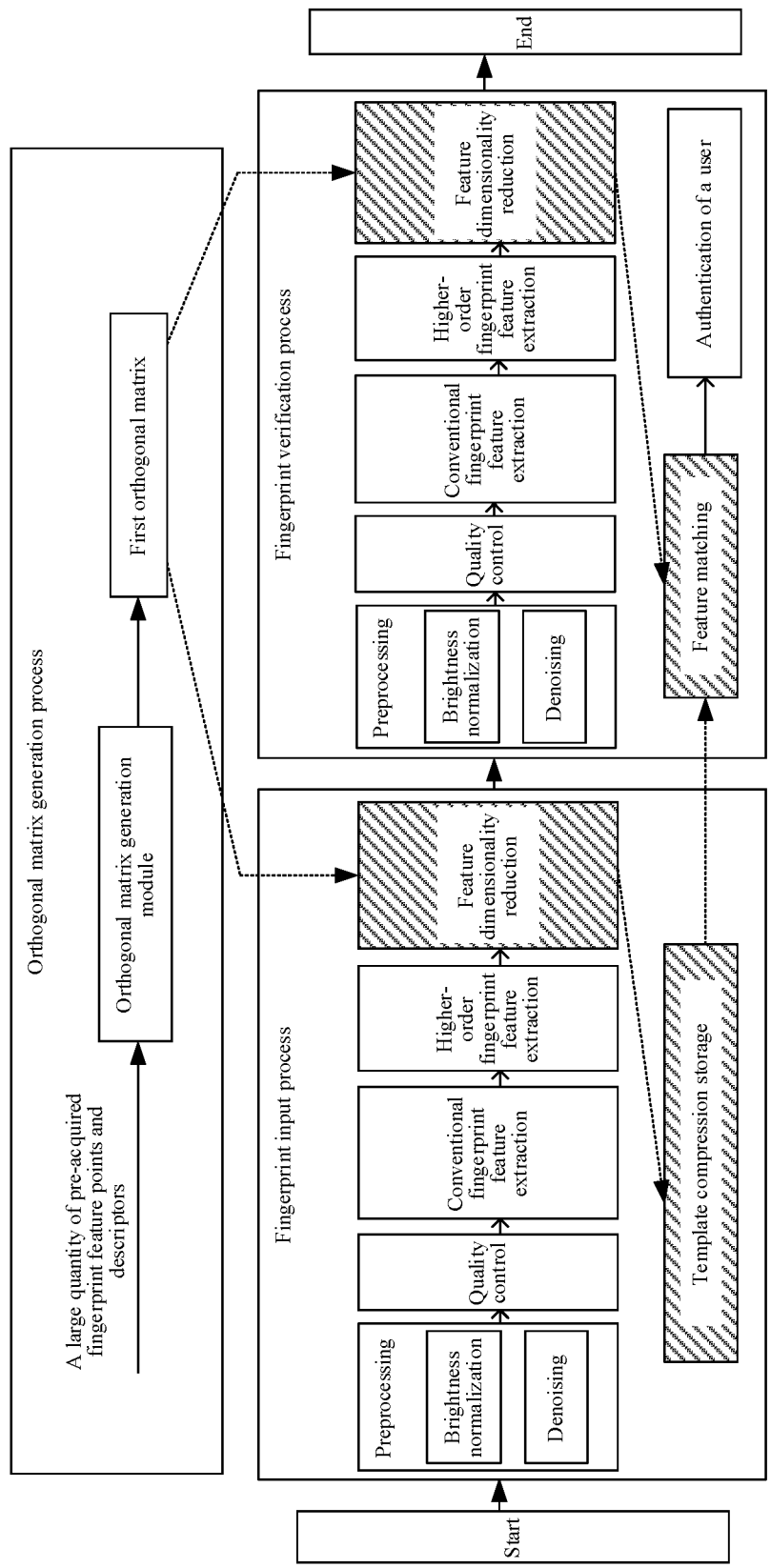
FIG. 4 is a schematic flowchart of a method for fingerprint recognition according to an embodiment of this application.

FIG. 4 is a schematic block diagram of a global process of fingerprint recognition. As shown in FIG. 4, fingerprint recognition usually includes a fingerprint input process and a fingerprint verification process. In this embodiment of this application, an orthogonal matrix generation process is added. It may be understood that the fingerprint input process in FIG. 4 may be implemented by the fingerprint input module in FIG. 3, the fingerprint verification process may be implemented by the fingerprint verification module in FIG. 3, and the orthogonal matrix generation process may be implemented by the orthogonal matrix generation module in FIG. 3.

The fingerprint input process may be understood as a process of preprocessing an acquired fingerprint image of a user, performing feature extraction based on a preprocessed fingerprint image, performing dimensionality reduction on an extracted feature, and finally storing a fingerprint feature obtained through dimensionality reduction as a fingerprint template.

For example, the fingerprint input process usually involves the following processing processes: preprocessing (including brightness normalization, denoising, and the like), quality control, conventional fingerprint feature extraction, higher-order fingerprint feature extraction, feature dimensionality reduction, and template compression storage.

Preprocessing is an image processing process of performing brightness normalization, denoising, and the like on the acquired fingerprint image.

Denoising means performing image denoising processing on the preprocessed fingerprint image to remove noise interference from the fingerprint image. A denoising method is not specifically limited in this embodiment of this application. For example, the denoising method is wavelet transform or bilateral filtering.

It should be understood that the foregoing merely uses an example in which preprocessing includes brightness normalization and denoising for description, and this embodiment of this application is not limited thereto. In fact, preprocessing may include other processing operations such as filtering processing, image enhancement, and binarization processing.

Quality control means determining image quality of a fingerprint image obtained through denoising, where a high-quality fingerprint image obtained is input, and a low-quality fingerprint image is not input.

Conventional fingerprint feature extraction means preliminarily extracting a fingerprint feature based on the fingerprint image obtained through denoising. A conventional fingerprint feature may be understood as an overall fingerprint feature (or a global feature).

Higher-order fingerprint feature extraction means preliminarily extracting a fingerprint detail feature point from a detailed fingerprint map. A higher-order fingerprint feature may be understood as a local feature more detailed than the conventional fingerprint feature.

Feature dimensionality reduction is a process of mapping a feature point to a subspace using a first orthogonal matrix. An instance of performing feature dimensionality reduction using the first orthogonal matrix in this embodiment of this application is described in detail later.

Template compression storage is a process of storing the fingerprint feature obtained through dimensionality reduction. Generally, an extraction result of the fingerprint feature is stored as the feature template. In this embodiment of this application, the first orthogonal matrix generated by the orthogonal matrix generation module may be invoked to perform dimensionality reduction on a to-be-input feature of the fingerprint image and then store a fingerprint feature obtained through dimensionality reduction to a fingerprint template library. Therefore, occupied memory space can be reduced.

The fingerprint verification process may be understood as a process of preprocessing a to-be-verified fingerprint image after the to-be-verified fingerprint image is acquired, performing feature extraction based on a preprocessed to-be-verified fingerprint image, performing dimensionality reduction on an extracted feature, and finally matching a feature that is obtained through dimensionality reduction and that is of the to-be-verified fingerprint with the fingerprint feature that is obtained through dimensionality reduction and that is stored in the fingerprint template. In this embodiment of this application, the fingerprint feature obtained through dimensionality reduction is used for matching or verification.

For example, the fingerprint verification process involves the following processing processes: preprocessing (including brightness normalization, denoising, and the like), quality control, conventional fingerprint feature extraction, higher-order fingerprint feature extraction, feature dimensionality reduction (also referred to as descriptor dimensionality reduction), feature matching, and authentication of a user (the user is a user inputting the fingerprint).

For descriptions about preprocessing, denoising, quality control, conventional fingerprint feature extraction, and higher-order fingerprint feature extraction, refer to the descriptions in the fingerprint input process. For brevity, details are not described herein again.

Feature matching means matching the feature that is obtained through dimensionality reduction and that is of the to-be-verified fingerprint image (the feature may be represented by a feature descriptor, for example, a first eigenvector) with the fingerprint feature (for example, a third eigenvector) stored in the fingerprint template.

The orthogonal matrix generation process may be understood as a process of generating the first orthogonal matrix based on a large quantity of pre-acquired fingerprint feature points.

The first orthogonal matrix is used to perform dimensionality reduction on the fingerprint feature. It should be understood that the first orthogonal matrix may also be named as, for example, a dimensionality reduction orthogonal matrix, a descriptor dimensionality reduction orthogonal matrix, or a fingerprint feature dimensionality reduction orthogonal matrix. This is not specifically limited in this embodiment of this application.

In this embodiment of this application, the first orthogonal matrix may be obtained through iterative calculation, or is generated through continuous attempts. The first orthogonal matrix may be generated offline based on the quantity of pre-acquired fingerprint feature points.

For example, the generation process of the first orthogonal matrix may be performed by the orthogonal matrix generation module in FIG. 4. Descriptors of the large quantity of pre-acquired fingerprint feature points are input to the orthogonal matrix generation module. The orthogonal matrix generation module is configured to output the first orthogonal matrix.

Figure 5:
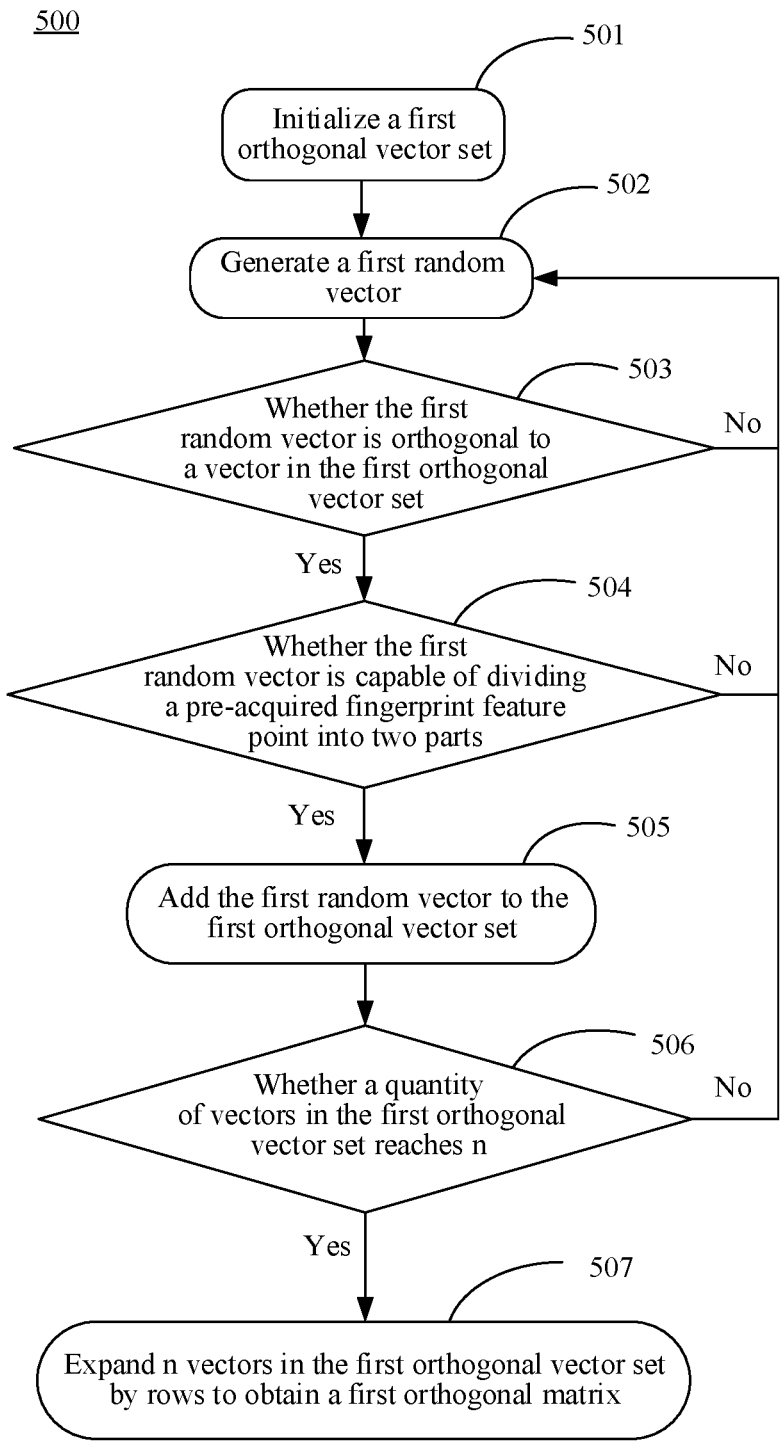
FIG. 5 is a diagram of obtaining a first orthogonal matrix according to an embodiment of this application.

The following describes the generation process of the first orthogonal matrix with reference to FIG. 5. FIG. 5 is a schematic flowchart of a method 500 for generating the first orthogonal matrix according to an embodiment of this application. As shown in FIG. 5, the method 500 includes at least the following steps.

Step 501: Initialize a first orthogonal vector set, where the first orthogonal vector set is null.

For example, the first orthogonal vector set is represented as R={ }. The first orthogonal vector set is null in an initial phase.

Step 502: Generate a first random vector, where the first random vector is an n-dimensional vector.

For example, the first random vector may be represented as $r=(r_1, r_2, \ldots, r_n)$. n is an integer greater than or equal to 2.

A manner for generating the first random vector is not specifically limited in this embodiment of this application. For example, the first random vector may be generated through a random function.

Step 503: Determine whether the first random vector is orthogonal to a vector in the first orthogonal vector set.

A specific manner for determining whether the first random vector is orthogonal to the vector in the first orthogonal vector set is not limited in this embodiment of this application. For example, if an inner product of the first random vector and the vector in the first orthogonal vector set is 0, the first random vector is orthogonal to the vector in the first orthogonal vector set.

That the first random vector is orthogonal to the vector in the first orthogonal vector set may be understood as that the first random vector is approximately orthogonal to the vector in the first orthogonal vector set. Optionally, whether the first random vector is orthogonal to the vector in the first orthogonal vector set may be determined by introducing an orthogonality threshold.

For example, if the inner product of the first random vector and the vector in the first orthogonal vector set is less than a preset orthogonality threshold, the first random vector is orthogonal to the vector in the first orthogonal vector set.

It may be understood that a value of the preset orthogonality threshold may tend to be infinitely small. A specific value of the orthogonality threshold is not limited in this embodiment of this application.

When the first random vector is orthogonal to the vector in the first orthogonal vector set, step 504 is performed; or when the first random vector is not orthogonal to the vector in the first orthogonal vector set, step 502 is performed.

Step 504: Determine whether the first random vector is capable of dividing the pre-acquired fingerprint feature point into two parts.

For example, the pre-acquired fingerprint feature point is divided into two parts with a first random vector r as a division plane. If quantities of feature points in the two parts are equal (or approximately equal), the first random vector may be included in the first orthogonal vector set.

Optionally, for the fingerprint feature point divided into the two parts by the first random vector r, a quantity difference threshold may be introduced to determine whether the quantities of feature points in the two parts are equal.

For example, if a difference between the quantities of feature points in the two parts is less than a predetermined quantity difference threshold, it is considered that the first random vector r may equally divide the pre-acquired fingerprint feature point.

When the pre-acquired fingerprint feature point is divided by the first random vector, if the first random vector is capable of dividing the pre-acquired fingerprint feature point into the two parts, step 505 is performed: or if the first random vector is incapable of dividing the pre-acquired fingerprint feature point into the two parts, step 502 is performed.

Step 505: Add the first random vector to the first orthogonal vector set.

If the first random vector r is capable of dividing the pre-acquired fingerprint feature point into the two parts, the first random vector r is added to a first orthogonal vector set R, that is, the first orthogonal vector set R=R∪r.

Step 506: Determine whether a quantity of vectors included in the first orthogonal vector set reaches n.

When the quantity of vectors included in the first orthogonal vector set reaches n, step 507 is performed: or when the quantity of vectors included in the first orthogonal vector set does not reach n, step 502 is performed, and step 502 to step 505 are repeatedly performed.

Step 507: Expand n vectors in the first orthogonal vector set by rows to obtain the first orthogonal matrix, where the first orthogonal matrix includes n row vectors, and the n row vectors of the first orthogonal matrix are orthogonal to each other.

For example, the first orthogonal matrix may be represented as the following n*n-dimensional orthogonal matrix:

$$A = \begin{bmatrix} r_1 \\ r_2 \\ \vdots \\ r_n \end{bmatrix} = \begin{bmatrix} r_{11} & r_{12} & \cdots & r_{1n} \\ r_{21} & r_{22} & \cdots & r_{2n} \\ \vdots & \vdots & \ddots & \vdots \\ r_{n1} & r_{n2} & \cdots & r_{nn} \end{bmatrix}$$

A represents the first orthogonal matrix. A includes the n row vectors. Each row vector includes n vector elements. Each row vector may be generated based on the foregoing steps 502 to 505.

Based on the foregoing process, the first orthogonal vector set is generated through continuous attempts. In this way, a most suitable orthogonal matrix for distinguishing a fingerprint feature, for example, the first orthogonal matrix, can be found.

The foregoing describes the generation process of the first orthogonal matrix. The following describes, with reference to FIG. 6, an embodiment of using the first orthogonal matrix.

Figure 6:
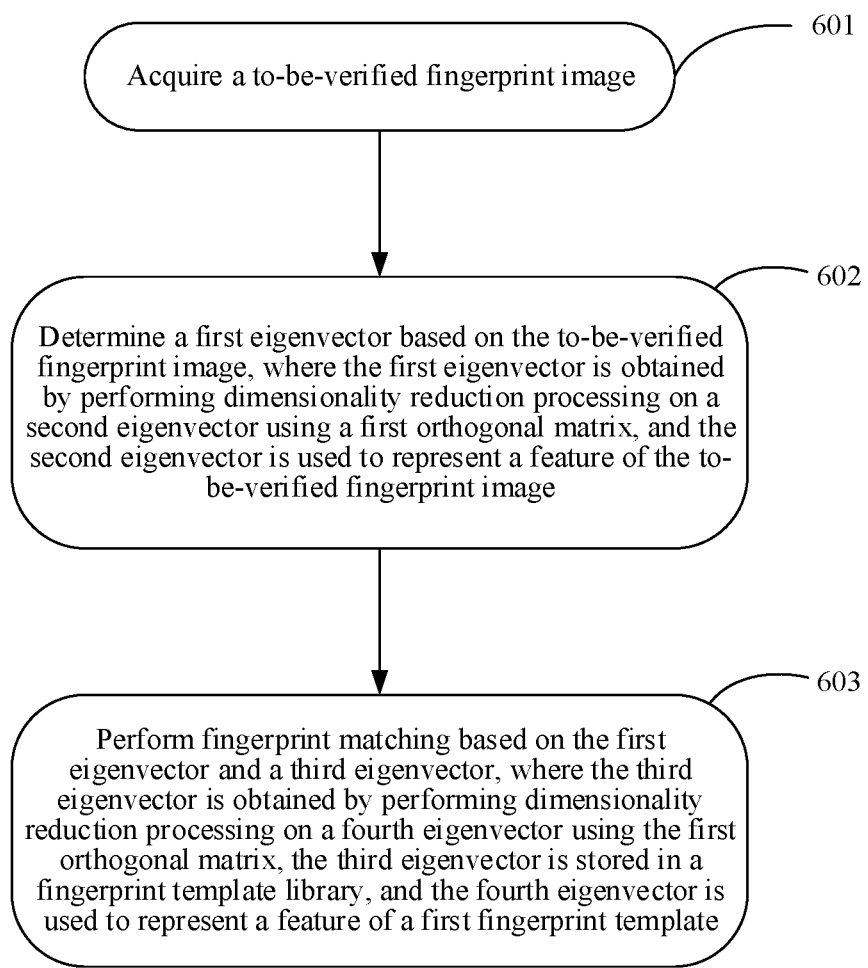
FIG. 6 is a schematic flowchart of a method for fingerprint recognition according to an embodiment of this application.

FIG. 6 is a schematic flowchart of a method 600 for fingerprint recognition according to an embodiment of this application: It should be understood that a first orthogonal matrix involved in the method 600 in FIG. 6 may be obtained by the method 500 in FIG. 5. It should be further understood that the method in FIG. 6 may be applied to the fingerprint unlocking scenario shown in FIG. 1. As shown in FIG. 6, the method 600 includes the following steps.

Step 601: Acquire a to-be-verified fingerprint image.

The to-be-verified fingerprint image may also be a to-be-matched fingerprint image. For example, the to-be-verified fingerprint image is an image acquired when a user presses a fingerprint unlocking region. For example, an example in which the user presses the fingerprint unlocking region is shown in (1) in FIG. 1.

Step 602: Determine a first eigenvector based on the to-be-verified fingerprint image, where the first eigenvector is obtained by performing dimensionality reduction processing on a second eigenvector using the first orthogonal matrix, and the second eigenvector is used to represent a feature of the to-be-verified fingerprint image.

The second eigenvector is used to represent a feature (including all features) extracted based on a preprocessed fingerprint image after the to-be-verified fingerprint image is preprocessed. Alternatively, the second eigenvector is used to represent a feature before dimensionality reduction processing is performed on the to-be-verified fingerprint image. Alternatively, the second eigenvector is used to represent a preprocessed to-be-verified fingerprint image.

The first orthogonal matrix includes a plurality of vectors (for example, row vectors). The plurality of vectors are generated through iterative calculation based on a pre-acquired fingerprint feature point. Each of the plurality of vectors is capable of dividing the pre-acquired fingerprint feature point into two parts. For example, the first orthogonal matrix is obtained by the method 500 shown in FIG. 5.

Optionally, determining the first eigenvector based on the to-be-verified fingerprint image includes:

preprocessing the to-be-verified fingerprint image to obtain the preprocessed fingerprint image:

performing feature extraction on the preprocessed fingerprint image to obtain a feature of the to-be-verified fingerprint image, and using the second eigenvector to represent the feature of the to-be-verified fingerprint image; and performing dimensionality reduction processing on the second eigenvector based on the first orthogonal matrix to obtain the first eigenvector.

For example, the acquired to-be-verified fingerprint image may be preprocessed (for example, processing of brightness normalization, denoising, or image enhancement). Feature extraction (for example, the foregoing conventional fingerprint feature extraction and higher-order fingerprint feature extraction) is performed on the preprocessed fingerprint image. Then, the feature of the to-be-verified fingerprint image is represented by the second eigenvector. Finally, dimensionality reduction processing is performed on the second eigenvector using the first orthogonal matrix, to obtain the first eigenvector.

After dimensionality reduction processing is performed on feature data of the to-be-verified fingerprint image, fingerprint matching may be performed using feature data obtained through dimensionality reduction.

It may be understood that the foregoing is described with an example in which a feature point descriptor is represented by an eigenvector, and this embodiment of this application is not limited thereto. For example, the first eigenvector is used as an example, and the first eigenvector may be referred to as a first feature point descriptor, a first feature matrix, a first descriptor matrix, a first feature point matrix, or the like.

Step 603: Perform fingerprint matching based on the first eigenvector and a third eigenvector, where the third eigenvector is obtained by performing dimensionality reduction processing on a fourth eigenvector using the first orthogonal matrix, the third eigenvector is stored in a fingerprint template library, and the fourth eigenvector is used to represent a feature of a first fingerprint template.

The fourth eigenvector is used to represent a feature (including all features) extracted based on a preprocessed to-be-input fingerprint image after a to-be-input fingerprint image (corresponding to the first fingerprint template) is preprocessed. Alternatively; the fourth eigenvector is used to represent a feature before dimensionality reduction processing is performed on the first fingerprint template. Alternatively, the fourth eigenvector is used to represent a preprocessed to-be-input fingerprint image.

In this embodiment of this application, feature data of a fingerprint template stored in the fingerprint template library is feature data obtained by performing dimensionality reduction processing using the first orthogonal matrix. For example, the first fingerprint template is used as an example. After the to-be-input fingerprint image (corresponding to the first fingerprint template) is acquired, the feature extracted based on the to-be-input fingerprint image may be represented by the fourth eigenvector before dimensionality reduction processing. After dimensionality reduction processing is performed on the fourth eigenvector using the first orthogonal matrix, feature data, for example, the third eigenvector, obtained through dimensionality reduction may be obtained. The third eigenvector is stored in the fingerprint template library. In this embodiment of this application, memory space occupied by the feature data (the third eigenvector) obtained through dimensionality reduction is smaller than that occupied by feature data (the fourth eigenvector) before dimensionality reduction, so that memory space of an electronic device occupied by the fingerprint data can be reduced. In addition, the feature data obtained through dimensionality reduction processing is used for matching, so that complexity can be reduced, a matching speed can be increased, and user experience in fingerprint recognition can be greatly improved.

It should be understood that the fingerprint template library may store one or more fingerprint templates. The first fingerprint template is used herein as an example for description. A processing principle for storing another fingerprint template to the fingerprint template library is similar to that for the first fingerprint template. For brevity, details are not described herein again.

It should be noted that a physical meaning of "dimensionality reduction" is as follows: space can be divided into $2^n$ pieces of subspace through n orthogonal vectors, and the space may be represented by n bits. For example, the space may be understood as space formed by fingerprint feature points.

Optionally, in an implementation, a quantity of bytes occupied by the third eigenvector is less than that of bytes occupied by the fourth eigenvector.

For example, an eight-dimensional vector is used as an example for description. The fourth eigenvector includes eight vector elements, and each vector element occupies storage space of four bytes. In this case, the fourth eigenvector occupies storage space of 32 bytes (bytes). Dimensionality reduction processing is performed on the fourth eigenvector to obtain the third eigenvector. The third eigenvector is represented by eight bits, and occupies only one byte. Therefore, occupied storage space is reduced to $\frac{1}{32}$ of the original one.

For ease of understanding, the following describes a dimensionality reduction process with reference to a specific instance.

For example, a feature descriptor of the first fingerprint template is represented by the following eight-dimensional vector:

$$V = [1, 2, 3, 4, 5, 6, 7, 8]$$

The foregoing eigenvector V represents the fourth eigenvector. Each vector element in the eigenvector V occupies memory space of four bytes (bytes), that is, the eigenvector V occupies 8*4=32 bytes (bytes) in total.

For example, the first orthogonal matrix obtained by the method 500 shown in FIG. 5 is the following 8*8 matrix:

$$A = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix}$$

It should be understood that the foregoing matrix A is an example of the first orthogonal matrix. This embodiment of this application is not limited thereto.

Optionally, in an embodiment, the following method is used to obtain the third eigenvector or perform dimensionality reduction on the fourth eigenvector:
performing a multiplication operation on the first orthogonal matrix and a transposed matrix of the fourth eigenvector to obtain a product;
processing the obtained product through a sign function to obtain a fifth eigenvector; and
performing binary conversion processing on the fifth eigenvector to obtain the third eigenvector.

In other words, the first orthogonal matrix is first multiplied by the transposed matrix of the fourth eigenvector. Then, the obtained product is processed through the sign function to obtain the fifth eigenvector. Finally, a vector element in the fifth eigenvector is processed into a binary value, to obtain the third eigenvector.

For example, multiplying the first orthogonal matrix by the transposed matrix of the fourth eigenvector includes:
performing calculation using the following formula:

$$A \cdot V' = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix} \begin{bmatrix} 1 \\ 2 \\ 3 \\ 4 \\ 5 \\ 6 \\ 7 \\ 8 \end{bmatrix} = \begin{bmatrix} 36 \\ -16 \\ 0 \\ -8 \\ 0 \\ 0 \\ 0 \\ 4 \end{bmatrix}$$

A represents the first orthogonal matrix. V' represents the transposed matrix of the fourth eigenvector. A·V' represents the product of the first orthogonal matrix and the transposed matrix of the fourth eigenvector.

For example, processing the product through the sign function to obtain the fifth eigenvector includes:
performing processing using the following formula:

$$\text{sign}(A \cdot V') = \begin{bmatrix} 1 \\ -1 \\ 1 \\ -1 \\ 1 \\ 1 \\ 1 \\ 1 \end{bmatrix}$$

sign (A·V') represents the fifth eigenvector.

For example, processing the vector element in the fifth eigenvector into the binary value includes:
performing binary processing using the following formula:

$$H(V) = \frac{\text{sign}(A \cdot V') + 1}{2} = \begin{bmatrix} 1 \\ 0 \\ 1 \\ 0 \\ 1 \\ 1 \\ 1 \\ 1 \end{bmatrix}$$

H(V) represents the third eigenvector. When A·V'<0, a value of H(V) is 0; or when A·V'≥0, a value of H(V) is 1.

It can be learned through the foregoing dimensionality reduction processing process that the third eigenvector obtained through dimensionality reduction processing may be represented by only eight bits (10101111), that is, occupies one byte. Compared with the fourth eigenvector occupying 32 bytes, the third eigenvector occupies only one byte that is $\frac{1}{32}$ of bytes originally occupied, so that occupied storage space is remarkably reduced.

It should be understood that the foregoing uses an example in which dimensionality reduction processing is performed on the fourth eigenvector using the first orthogonal matrix to obtain the third eigenvector for description. This embodiment of this application is not limited thereto.

Similarly, the first eigenvector may also be obtained with reference to the manner for obtaining the third eigenvector.

For example, the first eigenvector is obtained by the following method:
- performing a multiplication operation on the first orthogonal matrix and a transposed matrix of the second eigenvector to obtain a product:
- processing the obtained product through a sign function to obtain a sixth eigenvector; and
- performing binary conversion processing on a vector element in the sixth eigenvector to obtain the first eigenvector.

It should be further understood that for a dimensionality reduction process of performing dimensionality reduction processing on the second eigenvector using the first orthogonal matrix to obtain the first eigenvector, reference may be made to the foregoing example. For brevity, details are not described herein again.

The following describes an implementation of performing feature matching using a feature point descriptor obtained through dimensionality reduction.

Optionally, in an embodiment, step 603 includes: calculating a Hamming distance based on the first eigenvector and the third eigenvector; and when the Hamming distance is less than a first distance threshold, determining that the to-be-verified fingerprint image is successfully matched with the first fingerprint template.

In other words, whether matching succeeds may be determined by calculating the Hamming distance. If the Hamming distance is less than a specified threshold (for example, the first distance threshold), it is considered that feature points of the to-be-verified fingerprint image and the first fingerprint template are matched with each other, and then a subsequent process may be performed. For example, whether the to-be-verified fingerprint image is the user inputting a fingerprint may be further verified. Compared with calculation of a Euclidean distance between two feature point descriptors, calculation of the Hamming distance can reduce operational complexity while ensuring matching accuracy, save time, increase a matching speed, and bring better unlocking experience to the user.

It should be noted that the Hamming distance is used to represent a distance between two pieces of subspace. The subspace may be understood as subspace to which the feature point descriptor (for example, a representation form of the feature point descriptor is the foregoing eigenvector) is mapped to. Using the Hamming distance can effectively represent a distance between the feature point descriptors.

It should be understood that the foregoing uses an example in which it is determined, when the Hamming distance is less than the first distance threshold, that the to-be-verified fingerprint image is successfully matched with the first fingerprint template for description. This embodiment of this application is not limited thereto. In fact, that "the Hamming distance is less than the first distance threshold" may be replaced with another appropriate condition to determine whether matching succeeds. For example, that "the Hamming distance is less than the first distance threshold" is replaced with that "the Hamming distance is within a specific distance interval".

Certainly, if the to-be-verified fingerprint image is not successfully matched with the first fingerprint template, another fingerprint template stored in the fingerprint template library may be used for matching. A specific processing of matching the to-be-verified fingerprint image with the another fingerprint template is similar to that involving the first fingerprint template, and the fingerprint feature obtained through dimensionality reduction is also used for matching. In this way, the operational complexity is reduced, time is saved, and the matching speed is increased.

A specific manner for determining the Hamming distance is not limited in this embodiment of this application. The following provides descriptions with reference to a specific manner.

For example, calculating the Hamming distance based on the first eigenvector and the third eigenvector includes: calculating the Hamming distance using the following formula:

$$d = \text{count}(XOR(H_1, H_2))$$

Herein, d represents the Hamming distance. count ( ) represents a non-zero counting operation. XOR represents an exclusive OR operation. $H_1$ represents the first eigenvector. $H_2$ represents the third eigenvector.

For example, if $H_1$=(0 0 0 1), and $H_2$=(0 1 0 0), a quantity of bits in which values at a same bit are different is 2: a value of a second vector element of $H_1$ is different from that of a second vector element of $H_2$; and a value of a fourth vector element of $H_1$ is different from that of a fourth vector element of $H_2$.

Therefore, compared with performing matching by calculating a Euclidean distance in a conventional technology, calculating the Hamming distance to determine whether matching succeeds in embodiments of this application can reduce matching complexity while ensuring matching accuracy, and helps increase the matching speed.

It should be understood that the foregoing calculation formula for the Hamming distance is merely an example for description, and this embodiment of this application is not limited thereto.

Before the fingerprint method is performed, whether a fingerprint feature matching optimization function of the electronic device is on may be first determined. If the fingerprint feature matching optimization function is on, the method for fingerprint recognition is performed. In this embodiment of this application, the fingerprint feature matching optimization function is on by default.

In this embodiment of this application, the fingerprint feature matching optimization function may be solidified in a terminal, and does not need to be manually turned on by the user, or may be manually turned on or turned off by the user by providing an option. This embodiment of this application further provides a switch option for the fingerprint feature matching optimization function, for the user to select to turn on or turn off the fingerprint feature matching optimization function.

Optionally, the method further includes: displaying a first interface. The first interface includes a first option. The first option is used to select to turn on or turn off the fingerprint feature matching optimization function.

The first interface is a fingerprint setting interface. It may be understood that how to enter the first interface is not specifically limited in this embodiment of this application. For example, the fingerprint setting interface may be entered through a setting application. For another example, the fingerprint setting interface may be entered through a fingerprint-related application.

For example, the switch option (corresponding to the first option) for the fingerprint feature matching optimization function may be added to the fingerprint setting interface.

Figure 7:
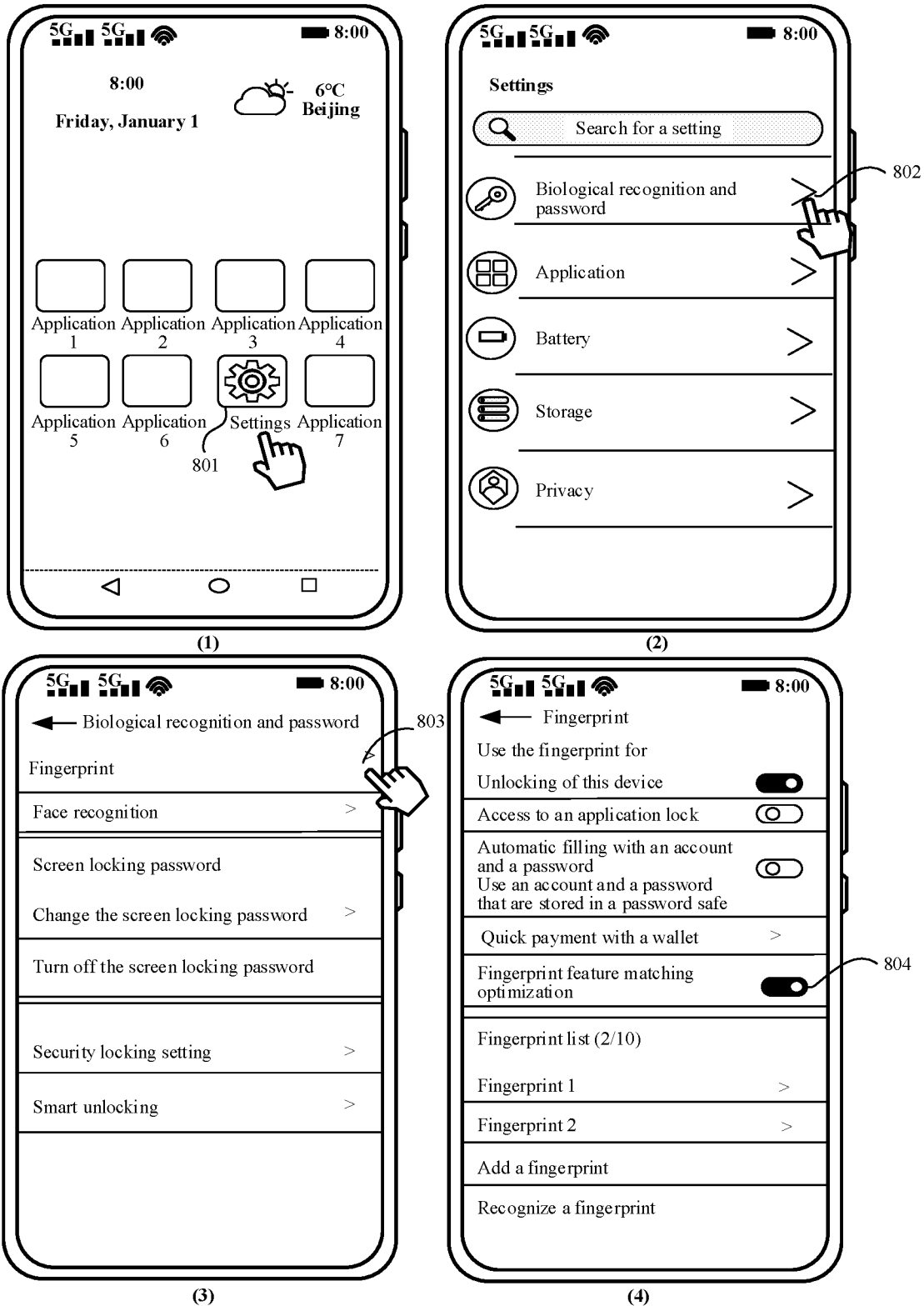
FIG. 7 is an example diagram of an interface according to an embodiment of this application.

FIG. 7 is an example diagram of an interface according to an embodiment of this application. As shown in (1) in FIG. 7, the user taps "Settings" 801 to enter a setting interface, for example, an interface shown in (2) in FIG. 7. It may be understood that the interface shown in (1) in FIG. 7 may further include an icon of another application, for example, an application 1 to an application 7.

As shown in (2) in FIG. 7, the interface includes a biological device and password control 802. It may be understood that the interface shown in (2) in FIG. 7 may further include another setting function, for example, an application setting, a battery setting, a storage setting, and a privacy setting shown in (2) in FIG. 7.

It may be understood that the setting options shown in (2) in FIG. 7 are merely examples of some setting functions, and this embodiment of this application is not limited thereto. It should be further understood that (2) in FIG. 7 further shows a setting search bar, and the user may search for a function setting fast through the setting search bar.

When the user taps the biological device and password control 802, an interface shown in (3) in FIG. 7 is entered. As shown in (3) in FIG. 7, the interface includes a fingerprint setting control 803.

Optionally, in addition to the fingerprint setting control 803, (3) in FIG. 7 may further include a face recognition setting control, a screen locking password management control (including "Change the screen locking password" and "Turn off the screen locking password"), a security locking setting control, and a smart unlocking control. It should be understood that a biological recognition and password option shown in (3) in FIG. 7 is merely an example for description, and this embodiment of this application is not limited thereto.

After the user taps the fingerprint setting control 803, an interface shown in (4) in FIG. 7 is displayed. As shown in (4) in FIG. 7, the interface includes a fingerprint feature matching optimization option 804. The user may tap "Fingerprint feature matching optimization" 804 to turn on or turn off the fingerprint template update function. For example, "Fingerprint feature matching optimization" 804 shown in (4) in FIG. 7 is on.

Optionally, in addition to "Fingerprint feature matching optimization" 804, (4) in FIG. 7 may further include another control for fingerprint management. For example, (4) in FIG. 7 shows fingerprint use options, including: an option that the fingerprint is used to unlock the device, an option that the fingerprint is used to access an application lock, an option that the fingerprint is used for automatic filling with an account and a password, and an option that the fingerprint is used for quick payment with a wallet. For another example, (4) in FIG. 7 shows a fingerprint list management option, including a management control for a fingerprint 1, a management control for a fingerprint 2, a fingerprint addition option, and a fingerprint recognition option.

It should be understood that an application scenario in FIG. 7 is merely for ease of understanding by a person skilled in the art, and is not intended to limit this embodiment of this application to the specific scenario in FIG. 7.

The foregoing describes, in detail with reference to FIG. 1 to FIG. 7, the method for fingerprint recognition provided in this embodiment of this application. The following describes an apparatus embodiment of this application in detail with reference to FIG. 8. It should be understood that an apparatus for fingerprint recognition in this embodiment of this application may perform various methods for fingerprint recognition in the foregoing embodiments of this application. In other words, for specific work processes of the following various products, refer to corresponding processes in the foregoing method embodiments.

Figure 8:
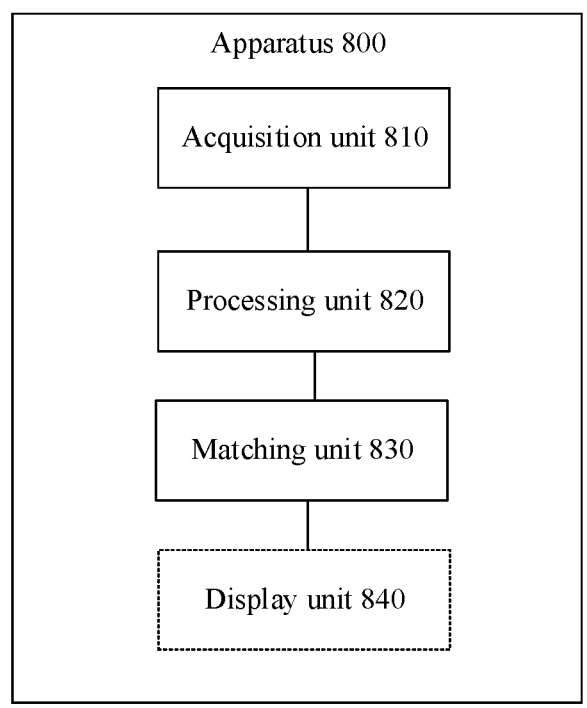
FIG. 8 is a schematic block diagram of an apparatus for fingerprint recognition according to an embodiment of this application.

FIG. 8 is a schematic block diagram of an apparatus 800 for fingerprint recognition according to an embodiment of this application. It should be understood that the apparatus 800 may perform the method for fingerprint recognition shown in FIG. 4 to FIG. 7. As shown in FIG. 8, the apparatus 800 for fingerprint recognition includes an acquisition unit 810, a processing unit 820, and a matching unit 830. Optionally, the apparatus 800 further includes a display unit 840. In a possible example, the apparatus 800 may be a terminal device.

In an example, the acquisition unit 810 is configured to acquire a to-be-verified fingerprint image.

The processing unit 820 is configured to determine a first eigenvector based on the to-be-verified fingerprint image. The first eigenvector is obtained by performing dimensionality reduction processing on a second eigenvector using a first orthogonal matrix. The second eigenvector is used to represent a feature of the to-be-verified fingerprint image.

The matching unit 830 is configured to perform fingerprint matching based on the first eigenvector and a third eigenvector. The third eigenvector is obtained by performing dimensionality reduction processing on a fourth eigenvector using the first orthogonal matrix. The fourth eigenvector is used to represent a feature of a first fingerprint template. The third eigenvector is stored in a fingerprint template library.

The first orthogonal matrix includes a plurality of vectors. The plurality of vectors are generated through iterative calculation based on a pre-acquired fingerprint feature point. Each of the plurality of vectors is capable of dividing the pre-acquired fingerprint feature point into two parts.

Optionally, in an embodiment, that the matching unit 830 is configured to perform fingerprint matching based on the first eigenvector and the third eigenvector specifically includes:

calculating a Hamming distance based on the first eigenvector and the third eigenvector; and when the Hamming distance is less than a first distance threshold, determining that the to-be-verified fingerprint image is successfully matched with the first fingerprint template.

Optionally, in an embodiment, the Hamming distance satisfies the following formula:

$$d = \text{count}(XOR(H_1, H_2))$$

Herein, d represents the Hamming distance. count ( ) represents a non-zero counting operation. XOR represents an exclusive OR operation. $H_1$ represents the first eigenvector. $H_2$ represents the third eigenvector.

Optionally, in an embodiment, the first orthogonal matrix is obtained in the following manner:

initializing a first orthogonal vector set, where the first orthogonal vector set is null;

generating a first random vector, where the first random vector is an n-dimensional vector:

determining whether the first random vector is orthogonal to a vector in the first orthogonal vector set:

when the first random vector is orthogonal to the vector in the first orthogonal vector set, determining whether the first random vector is capable of dividing the pre-acquired fingerprint feature point into two parts:
when the first random vector divides the fingerprint feature point, adding the first random vector to the first orthogonal vector set:
determining whether a quantity of vectors included in the first orthogonal vector set is n; and
when the quantity of vectors comprised in the first orthogonal vector set is n, expanding vectors in the first orthogonal vector set by rows to obtain the first orthogonal matrix, where the first orthogonal matrix includes n row vectors, and the n row vectors of the first orthogonal matrix are orthogonal to each other.

Optionally, in an embodiment, the third eigenvector is obtained by the following method:
performing a multiplication operation on the first orthogonal matrix and a transposed matrix of the fourth eigenvector to obtain a product:
processing the obtained product through a sign function to obtain a fifth eigenvector; and
performing binary conversion processing on a vector element in the fifth eigenvector to obtain the third eigenvector.

Optionally, in an embodiment, a quantity of bytes occupied by the third eigenvector is less than that of bytes occupied by the fourth eigenvector.

Optionally, in an embodiment, the display unit 840 is configured to:
display a first interface, where the first interface includes a first option, and the first option is used to turn on or turn off a fingerprint matching optimization function.

In a possible example, the acquisition unit 810 may be implemented by a fingerprint module. The processing unit 820 and the matching unit 830 may be implemented by a processor or a processing unit. The display unit 840 may be implemented by a screen.

It should be understood that the apparatus 800 is embodied in a form of a function unit. The term "unit" herein may be implemented in a form of software and/or hardware. This is not specifically limited in this embodiment of this application.

For example, the "unit" may be a software program, a hardware circuit, or a combination of a software program and a hardware circuit for implementing the foregoing functions. The hardware circuit may include an application specific integrated circuit (application specific integrated circuit, ASIC), an electronic circuit, a processor (for example, a shared processor, a dedicated processor, or a processor group) and a memory for executing one or more software or firmware programs, an integrated logic circuit, and/or another proper component capable of providing the foregoing functions. In a simple embodiment, a person skilled in the art may figure out that the apparatus 800 may use the form shown in FIG. 2.

A person of ordinary skill in the art may be aware that the units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

This application further provides a computer program product. When the computer program product is executed by a processor, the method according to any method embodiment of this application is implemented.

The computer program product may be stored in a memory, and may be finally converted, after processing processes such as preprocessing, compiling, assembling, and linking, into an executable target file that can be executed by the processor.

This application further provides a computer-readable storage medium, storing a computer program. When the computer program is executed by a computer, the method according to any method embodiment of this application is implemented. The computer program may be a high-level language program or an executable target program.

The computer-readable storage medium may be a volatile memory or non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. By way of example but not restrictive description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

A person of ordinary skill in the art may be aware that the units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division, and may be other division in actual implementation. For example, a plurality of units or components may be combined or integrated into another system, or some features may be ignored or not performed. In addition, the displayed or discussed mutual couplings, direct couplings, or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objective of the solution of this embodiment.

In addition, function units in embodiments of this application may be integrated into one processing unit, each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in embodiments of this application. The storage medium includes any medium capable of storing program code, such as a USB flash drive, a removable hard disk, a read-only memory ROM, a random access memory RAM, a magnetic disk, or an optical disc.

It should be understood that in embodiments of this application, sequence numbers of the processes do not mean execution sequences. The execution sequences of the processes should be determined based on functions and internal logic of the processes, and should not be construed as any limitation on implementation processes of embodiments of this application.

In addition, the terms "system" and "network" in this specification may be used interchangeably in this specification. The term "and/or" used in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. For example, A/B may indicate A or B.

The terms (or numbers) "first", "second", and the like that appear in embodiments of this application are merely used for the purpose of description, that is, used to distinguish between different objects, for example, different "eigenvectors", and cannot be understood as an indication or implication of relative importance or an implicit indication of a quantity of indicated technical features. Therefore, a feature limited by "first", "second", and the like may explicitly or implicitly include one or more such features. In the descriptions of embodiments of this application, "at least one piece (item)" means one or more. "A plurality of" means two or more. "At least one piece (item) of the following" or a similar expression thereof means any combination of these items, including any combination of a single piece (item) or a plurality of pieces (items).

For example, unless otherwise specified, an expression such as "an item includes at least one of the following: A, B, and C" appearing in embodiments of this application usually means that the item may be any one of the following: A: B: C: A and B: A and C: B and C: A, B and C: A and A: A, A and A: A, A and B: A, A and C, A, and B and B: A, C and C: B and B, B, B and B, B, B and C, and C and C; and C, C and C, and another combination of A, B, and C. The three elements A, B, and C are used above as examples to illustrate an optional entry of the item. When the expression is "an item includes at least one of the following: A, B, . . . , and X", that is, when there are more elements in the expression, an applicable entry of the item may be obtained according to the foregoing rule.

In conclusion, the foregoing descriptions are merely example embodiments of the technical solutions of this application, and are not intended to limit the protection scope of this application. Any modification, equivalent replacement, and improvement made within the spirit and principle of this application shall fall within the protection scope of this application.

The invention claimed is:

1. A method for fingerprint recognition, wherein the method is applied to an electronic device, and the method comprises:

acquiring a to-be-verified fingerprint image;

determining a first eigenvector based on the to-be-verified fingerprint image, wherein the first eigenvector is obtained by performing dimensionality reduction processing on a second eigenvector using a first orthogonal matrix, and the second eigenvector is used to represent a feature of the to-be-verified fingerprint image; and performing fingerprint matching based on the first eigenvector and a third eigenvector, wherein the third eigenvector is obtained by performing dimensionality reduction processing on a fourth eigenvector using the first orthogonal matrix, the fourth eigenvector is used to represent a feature of a first fingerprint template, and the third eigenvector is stored in a fingerprint template library; and the first orthogonal matrix comprises a plurality of vectors, the plurality of vectors are generated through iterative calculation based on a pre-acquired fingerprint feature point, and each of the plurality of vectors is capable of dividing the pre-acquired fingerprint feature point into two parts.

2. The method according to claim 1, wherein the performing fingerprint matching based on the first eigenvector and a third eigenvector comprises:

calculating a Hamming distance based on the first eigenvector and the third eigenvector; and when the Hamming distance is less than a first distance threshold, determining that the to-be-verified fingerprint image is successfully matched with the first fingerprint template.

3. The method according to claim 2, wherein the Hamming distance satisfies the following formula:

$$d = \text{count}(XOR(H_1, H_2)),$$

wherein d represents the Hamming distance, count ( ) represents a non-zero counting operation, XOR represents an exclusive OR operation, $H_1$ represents the first eigenvector, and $H_2$ represents the third eigenvector.

4. The method according to claim 1, wherein the first orthogonal matrix is obtained in the following manner:

initializing a first orthogonal vector set, wherein the first orthogonal vector set is null;
generating a first random vector, wherein the first random vector is an n-dimensional vector;
determining whether the first random vector is orthogonal to a vector in the first orthogonal vector set;
when the first random vector is orthogonal to the vector in the first orthogonal vector set, determining whether the first random vector is capable of dividing the pre-acquired fingerprint feature point into two parts;
when the first random vector divides the fingerprint feature point, adding the first random vector to the first orthogonal vector set;
determining whether a quantity of vectors comprised in the first orthogonal vector set is n; and
when the quantity of vectors comprised in the first orthogonal vector set is n, expanding vectors in the first orthogonal vector set by rows to obtain the first orthogonal matrix, wherein the first orthogonal matrix comprises n row vectors, and the n row vectors of the first orthogonal matrix are orthogonal to each other.

5. The method according to claim 1, wherein the third eigenvector is obtained by the following method:
performing a multiplication operation on the first orthogonal matrix and a transposed matrix of the fourth eigenvector to obtain a product;
processing the obtained product through a sign function to obtain a fifth eigenvector; and
performing binary conversion processing on a vector element in the fifth eigenvector to obtain the third eigenvector.

6. The method according to claim 1, wherein a quantity of bytes occupied by the third eigenvector is less than that of bytes occupied by the fourth eigenvector.

7. The method according to claim 1, wherein the method further comprises:
displaying a first interface, wherein the first interface comprises a first option, and the first option is used to turn on or turn off a fingerprint matching optimization function.

8. An electronic device, comprising at least one processor and at least one memory, wherein the at least one processor and the at least one memory are coupled, the at least one memory is configured to store a computer program, and when the computer program is executed by the at least one processor, the electronic device is enabled to perform operations comprising:
acquiring a to-be-verified fingerprint image;
determining a first eigenvector based on the to-be-verified fingerprint image, wherein the first eigenvector is obtained by performing dimensionality reduction processing on a second eigenvector using a first orthogonal matrix, and the second eigenvector is used to represent a feature of the to-be-verified fingerprint image; and
performing fingerprint matching based on the first eigenvector and a third eigenvector, wherein the third eigenvector is obtained by performing dimensionality reduction processing on a fourth eigenvector using the first orthogonal matrix, the fourth eigenvector is used to represent a feature of a first fingerprint template, and the third eigenvector is stored in a fingerprint template library; and
the first orthogonal matrix comprises a plurality of vectors, the plurality of vectors are generated through iterative calculation based on a pre-acquired fingerprint feature point, and each of the plurality of vectors is capable of dividing the pre-acquired fingerprint feature point into two parts.

9. A non-transitory computer-readable storage medium, wherein the non-transitory computer-readable storage medium stores a computer program, and when the computer program is executed by at least one processor, the at least one processor cause a computing device to perform operations comprising:
acquiring a to-be-verified fingerprint image;
determining a first eigenvector based on the to-be-verified fingerprint image, wherein the first eigenvector is obtained by performing dimensionality reduction processing on a second eigenvector using a first orthogonal matrix, and the second eigenvector is used to represent a feature of the to-be-verified fingerprint image; and
performing fingerprint matching based on the first eigenvector and a third eigenvector, wherein the third eigenvector is obtained by performing dimensionality reduction processing on a fourth eigenvector using the first orthogonal matrix, the fourth eigenvector is used to represent a feature of a first fingerprint template, and the third eigenvector is stored in a fingerprint template library; and
the first orthogonal matrix comprises a plurality of vectors, the plurality of vectors are generated through iterative calculation based on a pre-acquired fingerprint feature point, and each of the plurality of vectors is capable of dividing the pre-acquired fingerprint feature point into two parts.

10. The method according to claim 2, wherein the first orthogonal matrix is obtained in the following manner:
initializing a first orthogonal vector set, wherein the first orthogonal vector set is null;
generating a first random vector, wherein the first random vector is an n-dimensional vector;
determining whether the first random vector is orthogonal to a vector in the first orthogonal vector set;
when the first random vector is orthogonal to the vector in the first orthogonal vector set, determining whether the first random vector is capable of dividing the pre-acquired fingerprint feature point into two parts;
when the first random vector divides the fingerprint feature point, adding the first random vector to the first orthogonal vector set;
determining whether a quantity of vectors comprised in the first orthogonal vector set is n; and
when the quantity of vectors comprised in the first orthogonal vector set is n, expanding vectors in the first orthogonal vector set by rows to obtain the first orthogonal matrix, wherein the first orthogonal matrix comprises n row vectors, and the n row vectors of the first orthogonal matrix are orthogonal to each other.

11. The method according to claim 3, wherein the first orthogonal matrix is obtained in the following manner:
initializing a first orthogonal vector set, wherein the first orthogonal vector set is null;
generating a first random vector, wherein the first random vector is an n-dimensional vector;
determining whether the first random vector is orthogonal to a vector in the first orthogonal vector set;
when the first random vector is orthogonal to the vector in the first orthogonal vector set, determining whether the first random vector is capable of dividing the pre-acquired fingerprint feature point into two parts;

when the first random vector divides the fingerprint feature point, adding the first random vector to the first orthogonal vector set;

determining whether a quantity of vectors comprised in the first orthogonal vector set is n; and when the quantity of vectors comprised in the first orthogonal vector set is n, expanding vectors in the first orthogonal vector set by rows to obtain the first orthogonal matrix, wherein the first orthogonal matrix comprises n row vectors, and the n row vectors of the first orthogonal matrix are orthogonal to each other.

12. The method according to claim 2, wherein a quantity of bytes occupied by the third eigenvector is less than that of bytes occupied by the fourth eigenvector.

13. The method according to claim 3, wherein a quantity of bytes occupied by the third eigenvector is less than that of bytes occupied by the fourth eigenvector.

14. The method according to claim 4, wherein a quantity of bytes occupied by the third eigenvector is less than that of bytes occupied by the fourth eigenvector.

15. The method according to claim 5, wherein a quantity of bytes occupied by the third eigenvector is less than that of bytes occupied by the fourth eigenvector.

16. The method according to claim 2, wherein the method further comprises:
displaying a first interface, wherein the first interface comprises a first option, and the first option is used to turn on or turn off a fingerprint matching optimization function.

17. The method according to claim 4, wherein the method further comprises:
displaying a first interface, wherein the first interface comprises a first option, and the first option is used to turn on or turn off a fingerprint matching optimization function.

18. The electronic device according to claim 8, wherein the first orthogonal matrix is obtained in the following manner:
initializing a first orthogonal vector set, wherein the first orthogonal vector set is null;
generating a first random vector, wherein the first random vector is an n-dimensional vector;
determining whether the first random vector is orthogonal to a vector in the first orthogonal vector set;
when the first random vector is orthogonal to the vector in the first orthogonal vector set, determining whether the first random vector is capable of dividing the pre-acquired fingerprint feature point into two parts;
when the first random vector divides the fingerprint feature point, adding the first random vector to the first orthogonal vector set;
determining whether a quantity of vectors comprised in the first orthogonal vector set is n; and
when the quantity of vectors comprised in the first orthogonal vector set is n, expanding vectors in the first orthogonal vector set by rows to obtain the first orthogonal matrix, wherein the first orthogonal matrix comprises n row vectors, and the n row vectors of the first orthogonal matrix are orthogonal to each other.

19. The electronic device according to claim 8, wherein a quantity of bytes occupied by the third eigenvector is less than that of bytes occupied by the fourth eigenvector.

20. The non-transitory computer-readable storage medium according to claim 9, wherein the first orthogonal matrix is obtained in the following manner:
initializing a first orthogonal vector set, wherein the first orthogonal vector set is null;
generating a first random vector, wherein the first random vector is an n-dimensional vector;
determining whether the first random vector is orthogonal to a vector in the first orthogonal vector set;
when the first random vector is orthogonal to the vector in the first orthogonal vector set, determining whether the first random vector is capable of dividing the pre-acquired fingerprint feature point into two parts;
when the first random vector divides the fingerprint feature point, adding the first random vector to the first orthogonal vector set;
determining whether a quantity of vectors comprised in the first orthogonal vector set is n; and
when the quantity of vectors comprised in the first orthogonal vector set is n, expanding vectors in the first orthogonal vector set by rows to obtain the first orthogonal matrix, wherein the first orthogonal matrix comprises n row vectors, and the n row vectors of the first orthogonal matrix are orthogonal to each other.

* * * * *